(12) United States Patent
Mayer et al.

(10) Patent No.: US 9,809,401 B2
(45) Date of Patent: Nov. 7, 2017

(54) OVERLAPPING APPARATUS

(71) Applicant: Textor Maschinenbau GmbH, Wolfertschwenden (DE)

(72) Inventors: Josef Mayer, Memmingerberg (DE); Wilfried Maier, Dietmannsried (DE); Jörg Schmeiser, Wiggensbach (DE)

(73) Assignee: TEXTOR MASCHINENBAU GMBH, Wolfertschwenden (DE)

( * ) Notice: Subject to any disclaimer, the term of this patent is extended or adjusted under 35 U.S.C. 154(b) by 0 days.

(21) Appl. No.: 15/069,318

(22) Filed: Mar. 14, 2016

(65) Prior Publication Data

US 2016/0272440 A1 Sep. 22, 2016

(30) Foreign Application Priority Data

Mar. 18, 2015 (DE) .................. 10 2015 104 055

(51) Int. Cl.
| | |
|---|---|
| *B65G 57/32* | (2006.01) |
| *B26D 7/32* | (2006.01) |
| *B65G 47/08* | (2006.01) |
| *B65G 47/68* | (2006.01) |
| *B65G 15/50* | (2006.01) |
| *B65G 41/00* | (2006.01) |

(52) U.S. Cl.
CPC .............. *B65G 57/32* (2013.01); *B26D 7/32* (2013.01); *B65G 15/50* (2013.01); *B65G 41/00* (2013.01); *B65G 47/084* (2013.01); *B65G 47/68* (2013.01); *B26D 2210/02* (2013.01)

(58) Field of Classification Search
CPC ...... B65G 47/084; B65G 47/68; B65G 47/71; B65G 57/32; B26D 7/32
See application file for complete search history.

(56) References Cited

U.S. PATENT DOCUMENTS

| | | | | |
|---|---|---|---|---|
| 4,645,061 A | * | 2/1987 | Welch ................... | B65G 57/32 |
| | | | | 198/418.4 |
| 6,152,284 A | * | 11/2000 | Sandberg ............... | B65G 47/52 |
| | | | | 198/432 |
| 7,114,609 B2 | * | 10/2006 | Christman ............ | B65B 25/146 |
| | | | | 198/419.2 |

FOREIGN PATENT DOCUMENTS

| | | | | |
|---|---|---|---|---|
| DE | 3642123 A1 | * | 6/1988 | ............... B65D 7/32 |
| DE | 102013206510 A1 | | 6/2014 | |
| DE | EP 2878556 A1 | * | 6/2015 | ............... B65D 7/32 |
| GB | EP 0274229 A2 | * | 7/1988 | ........... B65G 47/084 |
| WO | 2004011209 A1 | | 2/2004 | |
| WO | WO 2004011209 A1 | * | 2/2004 | ............... B26D 7/06 |

OTHER PUBLICATIONS

Extended German search report for related German application No. 102015104055.7, dated: Feb. 23, 2016, pp. 9.

* cited by examiner

*Primary Examiner* — Thomas Randazzo
(74) *Attorney, Agent, or Firm* — Cantor Colburn LLP

(57) ABSTRACT

The invention relates to an apparatus for the lateral overlapping of portions which are transported in a longitudinal direction and which each comprise at least one slice cut off from a food product, having at least one overlapping unit which comprises a belt conveyor having at least two tracks, wherein an upper track and a lower track are deflected at the incoming side about a common input axle and at the outgoing side about two output axles disposed at different height levels.

27 Claims, 11 Drawing Sheets

Fig. 8

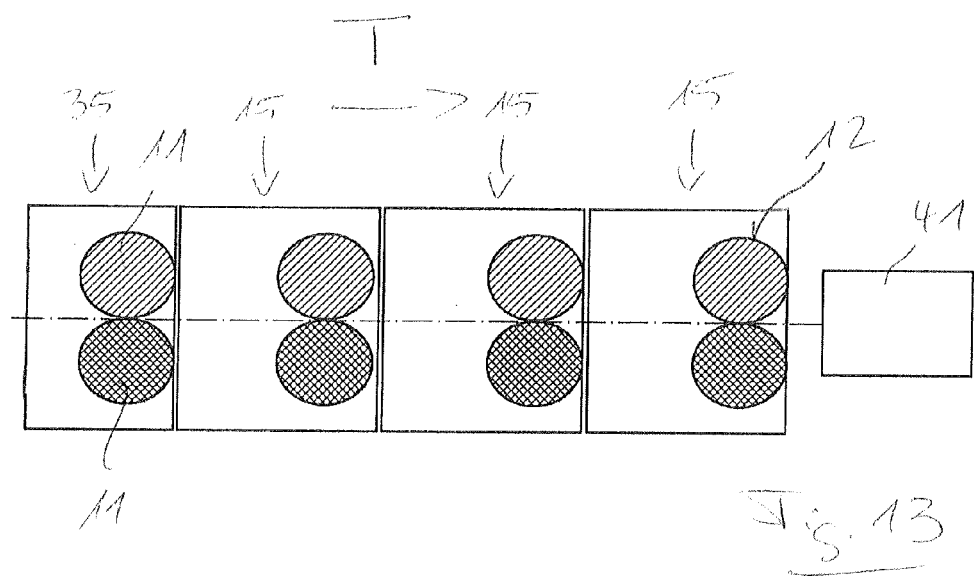

OVERLAPPING APPARATUS

Figure 1:
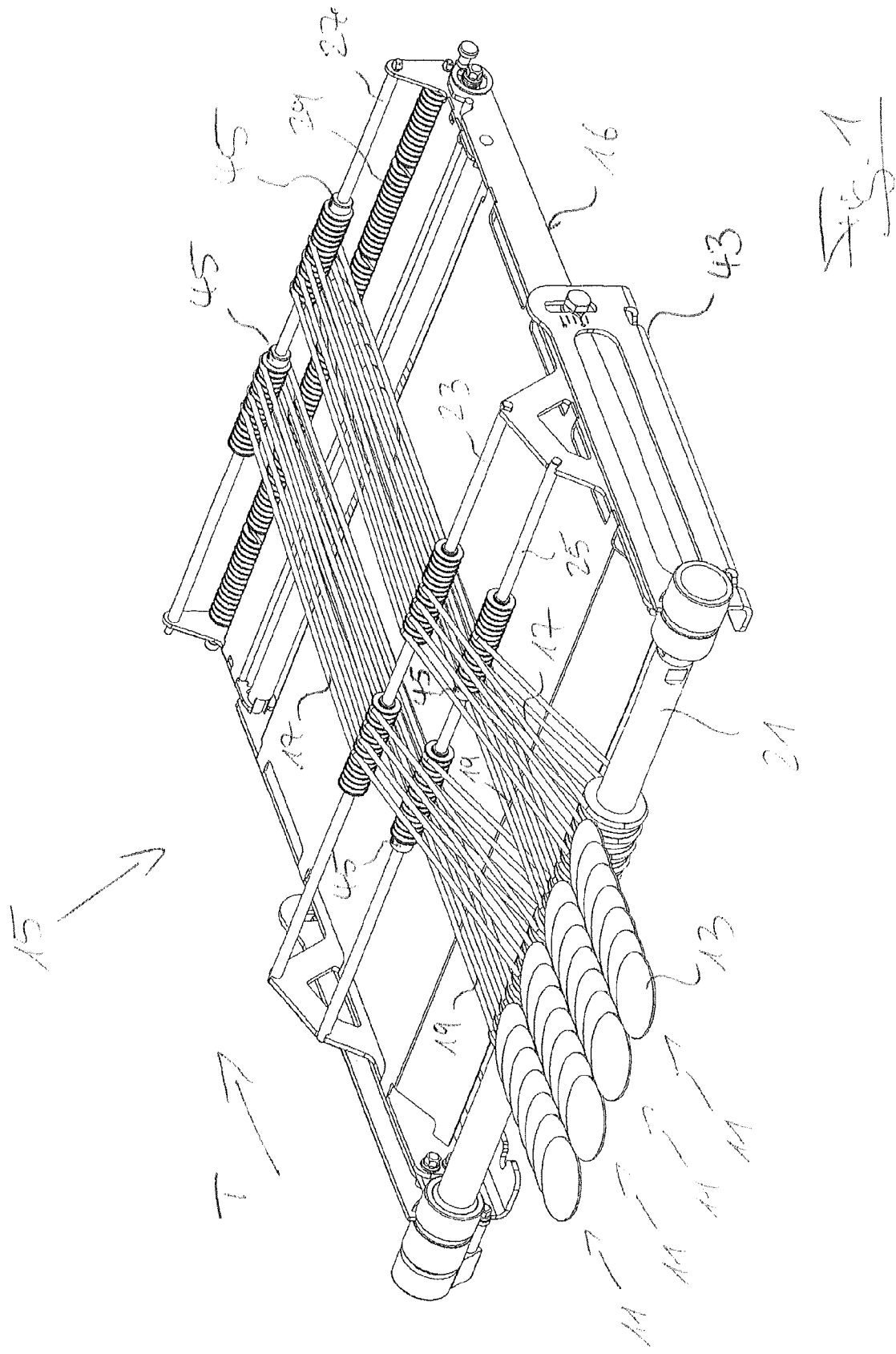

The invention relates to an apparatus and to a method for a lateral overlapping of portions which are transported in a longitudinal direction and which each comprise at least one slice cut off from a food product.

A lateral overlapping of portions can be necessary, for example, when a plurality of food products disposed next to one another such as loaves of sausage or cheese are simultaneously sliced by means of a slicing apparatus, e.g. by means of a high-speed slicer, and a single portion of one or more food slices is thereby generated in each track. It is namely frequently desired in practice to form total portions from, for example, two such single portions, wherein said total portions should each be placed at a downstream packaging apparatus into a packaging provided for sales and should be presented therein in the form of laterally overlapped single portions.

A lateral overlapping of portions has previously typically taken place by means of conveying devices of relatively long construction whose construction length can, for example, amount to 3 to 4 m. Known overlappers comprise two belt conveyers which are arranged in a continuous separate manner above one another in different planes and with which a so-called rocker is associated at the input side by means of which a part of the incoming portions is conducted to the upper conveying plane and another part of the incoming portions is conducted to the lower conveying plane. A portion from the upper conveying plane is then placed from the upper conveying plane onto a portion transported in the lower conveying plane at the end of the upper conveying plane. Each of the two conveying planes is provided with at least one separate drive so that the conveying speeds can be set accordingly. A further drive is required for the separate associated rocker at the input side.

Known overlappers therefore not only need a lot of room due to their length, but also have a complex and expensive structure since the two conveying planes and the rocker mean at least three independent belt conveyors have to be provided and have to be equipped with mutually independent drives. Such an effort and/or cost is appropriate and suitable for large throughput quantities, in particular with a permanent use of the overlapping function.

It is therefore the object of the invention to provide an apparatus and a method of the initially named kind which allow a lateral overlapping of portions in a manner which is as simple and as inexpensive as possible and which can in particular be used in as versatile a manner as possible.

This object is satisfied by the features of claim 1 and in particular in that at least one overlapping unit is provided which comprises a belt conveyor having at least two tracks, wherein an upper track and a lower track are deflected at the incoming side about a common input axle and at the outgoing side about two output axles disposed at different height levels.

In accordance with the invention, two incoming portions disposed next to one another can be brought to different height levels and can subsequently be placed onto one another without the aid of further devices. Since the two tracks are deflected about a common input axle at the incoming side, the overlapping unit in accordance with the invention can adjoin a preceding conveyor directly and without interposition of a rocker.

The two tracks of the belt conveyor can be guided such that the different height levels are reached within a comparatively short conveying path in the longitudinal direction. The overlapping unit in accordance with the invention therefore only requires a comparatively short construction length. It has been found that less than half the construction length required by known overlappers is sufficient for an overlapping unit in accordance with the invention.

The belt conveyor preferably comprises a plurality of conveyor belts extending next to and spaced apart from one another for each of the two tracks. The conveyor belts are preferably round belts having a circular, oval or elliptical cross-section, but with other cross-sectional shapes also being possible and with, for example, so-called trapezoidal belts or T belts also being able to be used. Such conveyor belts, and thus the tracks formed by them, can be guided and deflected simply and reliably in the respectively desired manner, and indeed both with varying inclination, i.e. varying in height, and with varying direction in the transverse direction.

A particular advantage of the invention comprises the fact that no components of the overlapping unit have to be adjusted during the overlapping operation for the realization of a specific overlapping concept, that is for the generation of a specific placement pattern of the portions conveyed by the two tracks. The manner of the overlap, i.e. the placement pattern, only needs to be set once at the start by setting the course of the two tracks.

Both tracks can furthermore be driven together. A common drive particularly preferably takes place via the common input axle. It is consequently possible to operate the overlapping unit in accordance with the invention with only one single drive.

The invention thus makes it possible to provide overlapping units which require a relatively small amount of room, which are of comparatively structure and which are very inexpensive, which in turn provides the advantageous possibility in accordance with a preferred embodiment of the invention to implement a cassette concept or module concept in which the overlapping unit is configured as a module which can be handled as a whole and which can, for example be removed from and reinserted into a substructure or frame as a whole. A stationary substructure to which the cassette can be coupled can be provided for such an overlapper cassette. On the one hand, as many differently configured overlapping units as desired can hereby generally be provided which can be selectively inserted into the respective plant by the user to implement a respective desired, application-specific overlapping concept using a correspondingly configured overlapper cassette. It is furthermore possible to use a plurality of overlapping units after one another, in particular configured in a mutually coordinated manner, to implement overlapping concepts using corresponding overlapping procedures taking place successively after one another in time. It is furthermore possible to integrate one or more overlapping units into a higher-ranking functional unit, in particular into a high-speed slicer. An overlapping unit can thus e.g. be integrated onto the so-called portioning system of a food slicer and can in this respect in particular be coupled to the slicer rack. In this respect, the overlapping unit can be used, for example, instead of a so-called control belt which is disposed downstream of a portioning belt of the slicer on which the portions are formed from the slices cut off by means of the cutting blade of the slicer.

A large variation possibility for a plant operator thus results using the apparatus in accordance with the invention so that smaller lots having different placement patterns can also be processed.

Provision is furthermore preferably made that the deflection position at the incoming side and/or at the outgoing side is variable in the transverse direction for at least one of the tracks. The track spacing between the upper track and the lower track can e.g. be set in this manner. The track spacing and the track positions in the transverse direction can furthermore be adapted to an upstream conveyor over which the portions run in. The degree of a lateral overlap can be set at the outgoing side by the variability of the deflection positions.

It is generally possible in accordance with the invention to configure the overlapping unit such that a degree of overlap of zero results at the outgoing side; the two tracks are consequently disposed next to one another in the transverse direction at the outgoing side. An overlapping unit configured in this manner can be required in specific applications in order e.g. to implement a simple "passage" of portions without any lateral overlap. In this respect, portions can be combined together or moved apart; that is their lateral spacing can be decreased or increased. A passage of portions free of overlap therefore does not have to be a straight travel in parallel with the longitudinal direction. An overlap-free travel can, for example, be desired within a conveying path comprising a plurality of modules by which both application without overlap and applications with overlap should be able to be carried out and which comprises a plurality of reception spaces for replaceable conveyor modules. The overlapping unit in accordance with the invention can consequently, where required, also be used with a correspondingly present adjustability of the tracks without portion overlap purely as a conveyor module p having tracks which extend in parallel with or obliquely away from or toward one another.

The overlapping unit in accordance with the invention can consequently generally be freely configurable with respect to the track guidance, either manually or by a motor via an associated control in order to provide a wide variety of applications in this manner.

As already mentioned above, a common drive can be associated with both tracks of the overlapping unit. The drive can take place via the common input axle. It is thus possible, for example, to provide a single drive shaft as a common input axle for the two tracks and to set it into rotation by means of a single drive motor. This drive shaft can be provided with rotationally fixedly couplable deflection rollers or deflection sleeves for the conveyor elements of the two tracks, for example with grooved sleeves for conveyor belts, with the shape of the grooves being matched to the cross-section of the belts.

Alternatively, the drive of the two tracks can also take place at the outgoing side by means of the two output axles. In this respect, a separate drive can be associated with each output axle so that the conveying speeds of the two tracks can be set independently of one another by a corresponding control of the two drives.

An independent regulation of the conveying speeds of the two tracks can alternatively also take place at the incoming side at the common input axle in that, for example, a so-called "shaft-in-shaft" concept is provided having two concentric shafts which are pushed into one another and with which a respective separate drive is associated. Such a concept can in particular be advantageous when the overlapping unit has a plurality of track pairs, each having an upper track and a lower track, which are arranged alternately in the transverse direction. If only a single track pair having a single upper track and a single lower track is provided, the common input axle can be designed in split form and can be provided with a drive at the left hand side for the one track and with a drive at the right hand side for the other track.

The invention is not restricted to the generation of a lateral overlap of the portions. It is also possible to produce a longitudinal offset between the two portions by a corresponding setting of the conveying speeds of the two tracks. A comparatively simple possibility requiring two drives for the corresponding regulation of the conveying speeds results when each of the two tracks has its own drive. If, in contrast, a common drive is provided, for example at the common input axle, the conveying speeds of the two tracks can be set relative to one another in that different conveyor lengths in the two tracks are provided. This can take place, for example, in that the two tracks differ from one another with respect to the deflection path at the input axle and/or at the output axles. Differently long deflection paths can be achieved, for example, by deflection rollers or deflection sleeves having diameters of different sizes.

Consequently, in accordance with a preferred embodiment of the invention, provision is generally made that a longitudinal offset of the portions conveyed in the tracks can be set to a predefined measure by setting the conveying speeds of the tracks relative to one another.

If no longitudinal offset is desired between the portions and if the conveyor lengths of the two tracks differ from one another due to the respectively selected track guidance, this conveyor length difference can be compensated in that the conveying speeds of the two tracks are set differently. If only a common drive is provided at the common input axle, for example, such a compensation can e.g. be achieved by differently long deflection paths, for example, at the input axle or at the output axles.

The effects of different conveying speeds on the placing of portions over one another at the outgoing side can be neglected.

If the two tracks have different conveying speeds, provision can be made in the case of a conveyor arranged directly upstream of the overlapping unit that the conveying speed of this conveyor lies between the conveying speeds of the two tracks.

The guidance of the two tracks determines the degree of the lateral overlap of the portions conveyed by means of the tracks and the transverse position at the outgoing side of the total portion formed by the portions disposed above one another. Either only one track can contribute to the transverse offset of the portions relative to one another required for a lateral overlap, with it alternatively also being possible that bot tracks make a contribution.

Provision is accordingly made in accordance with a preferred embodiment of the invention that both the upper track and the lower track extend obliquely to the longitudinal direction. Both tracks run obliquely toward one another in this respect.

A particularly advantageous guidance of the two tracks, which in particular allows a short construction length and in this respect nevertheless ensures an undisturbed portion transport, can be implemented between the input axle and the output axles by a correspondingly skillful deflection of the tracks.

An intermediate deflection unit which preferably comprises two deflection axles both spaced apart in the longitudinal direction and disposed at different height levels is in particular provided between the input axle and the output axle for the upper track.

Provision can in particular be made by an intermediate deflection unit that the two tracks have a sufficiently large vertical spacing at the outgoing side in order not to impair portions conveyed on the lower track by the lower or returning run of the upper track.

Accordingly, in accordance with an embodiment of the invention, the intermediate deflection unit can be active in an inclination-varying manner such that the upper track extends above the lower track in a region with both runs at the output side.

It can furthermore be achieved by the intermediate deflection unit that the upper track and in particular its returning lower run quickly gains height in order to avoid an impairment of the portions on the lower track in a region at the input side. An intermediate deflection can in particular also take place in the transverse direction to prevent or reduce a lateral overlap of the two tracks, i.e. to hold the two tracks apart laterally, for at least so long until a sufficiently large clear height is achieved between the tracks for portions conveyed by means of the lower track.

The intermediate deflection unit can accordingly be active in a direction-varying manner such that the lower run of the upper track includes a different angle with the longitudinal direction in a region at the input side than the upper run of the upper track.

The intermediate deflection unit can furthermore avoid or reduce a lateral overlap between the lower run of the upper track and the upper run of the lower track until a predefined clear height is achieved between these two runs. It is hereby prevented that the two runs contact one another and/or that a portion lying on the upper run of the lower track comes into contact with the lower run of the upper track.

Provision can in particular be made that an intermediate deflection unit is active in both an inclination-varying and a direction-varying manner for the lower run of the upper track, that is in particular the lower run of the upper track is drawn both upwardly and to the side.

The intermediate deflection unit can, for example, comprise one or more deflection axles extending in parallel with the input axle and with the output axles, on which deflection axles, for example, deflection rolls or deflection sleeves are freely rotatably arranged whose transverse positions are or can be respectively set in accordance with the desired track guidance. The position of one or each deflection axle relative to the input axles and/or to at least one of the output axles can be adjustable to be able to match the overlapping unit to a respective application and in particular to the height of the respective portions to be conveyed.

In a possible embodiment, an intermediate deflection unit is provided only for the upper track. The two runs of the lower track can each extend in a straight line between the input axle and the output axle.

As already described above, the overlapping unit can either comprise exactly one track pair or a plurality of track pairs arranged next to one another in the transverse direction and each having an upper track and a lower track. In this manner, a large variety of overlap concepts and placement patterns can be realized for total portions. A common drive, e.g. in the form of a common drive shaft forming the input axle, can be associated with all track pairs.

As likewise already mentioned above, the overlapping unit can be configured as a cassette, namely as a module which is coupled in operation to a stationary substructure, which is removable and reinsertable as a whole and which comprises a base for coupling to the substructure as well as the belt conveyor supported by the base.

A drive motor or a plurality of drive motors for the cassette can be integrated into the substructure and can remain at the substructure with a removed cassette. With such a concept, only that component can consequently respectively be replaced in a simple and inexpensive manner which has to be configured differently for implementing specific applications.

In an embodiment, the overlapping apparatus in accordance with the invention can comprise a plurality of overlapping units which are connected after one another in the longitudinal direction.

The overlapping apparatus in accordance with the invention, which comprises one or more overlapping units of the kind disclosed here, can be an element of a plant which is also called a production line and which is disposed downstream of at least one slicing apparatus for food products. The overlapping apparatus in accordance with the invention can also be a complete production line Including one or more high-sped slicers and a downstream plant.

If a plurality of overlapping units are provided, they can be arranged directly following one another and corresponding with one another, i.e. matched to one another, with this not being compulsory, however. Pure passage paths or passage modules without an overlapping function can be provided between overlapping units in accordance with the invention.

As already mentioned above, in accordance with an embodiment of the invention, an overlapping unit can be configured or configurable such that no overlap takes place and the two tracks extend continuously next to one another or lead toward or away from one another, i.e. such an overlapping unit in accordance with the invention can also be used as required purely as a passage module or as a module for combining or moving apart.

A plurality of overlapping units in accordance with the invention following one another can be configured differently such that, viewed in the longitudinal direction, the respective desired final total portion is formed successively, and indeed by overlapping procedures taking place after one another in time at a respective one of the overlapping units.

The invention also relates to an overlapping unit per se which comprises no additional upstream or downstream devices. Consequently, protection is also independently claimed for an overlapping unit for the lateral overlapping of portions which are transported in a longitudinal direction and which each comprise at least one slice cut off from a food product, wherein the overlapping unit comprises a belt conveyor having at least one upper track and at least one lower track which are deflected at the incoming side about a common input axles and at the outgoing side about two output axles disposed at different height levels.

The overlapping unit can be configured as a cassette, namely as a module which is coupled in operation to a stationary substructure, which is removable and reinsertable as a whole and which comprises a base for coupling to the substructure as well as the belt conveyor supported by the base. The substructure can be a slicer rack so that an overlapping unit in accordance with the invention can be integrated into a slicer.

The invention furthermore relates to a method for forming total portions which each comprise at least two laterally overlapping portions which each comprise at least one slice cut off from a food product, wherein, in the method, the two portions are supplied in tracks disposed next to one another to an overlapping unit which comprises a belt conveyor associated with the two tracks and having an upper track leading to an upper height level and having a lower track leading to a lower height level, and wherein an upper portion is conveyed by means of the upper track over a lower portion conveyed by means of the lower track and is subsequently placed onto the lower portion. In this respect, the upper track and the lower track are disposed next to one another at the incoming side and mutually laterally overlapping at different height levels at the outgoing side.

In a possible embodiment of this method, the total portions can each be formed by means of a plurality of overlapping units connected after one another in the longitudinal direction successively by overlapping procedures respectively taking place after one another in time at one of the overlapping units.

Provision can furthermore be made in the method that a longitudinal offset of the portions conveyed in the tracks is set to a predefined measure by setting the conveying speeds of the tracks relative to one another.

In accordance with an embodiment of the method, a conveyor length difference between the two tracks is furthermore compensated in that the conveying speeds of the two tracks are set differently.

The individual portions which are conveyed by means of the at least two tracks of the belt conveyor of the overlapping unit in accordance with the invention can be the same, with this not being compulsory, however. The portions can also be produced from different product types so that the total portions formed at the outgoing side are then each so-called mixed portions.

The portions preferably each comprise a plurality of product slices arranged overlapping in the longitudinal direction. This is, however, not compulsory. Stacked portions can generally also be laterally overlapped. As already initially mentioned, the portions can also each only comprise a single slice. A respective total portion formed by means of the overlapping unit in accordance with the invention then, for example, comprises two mutually laterally overlapping single slices.

Figure 2:
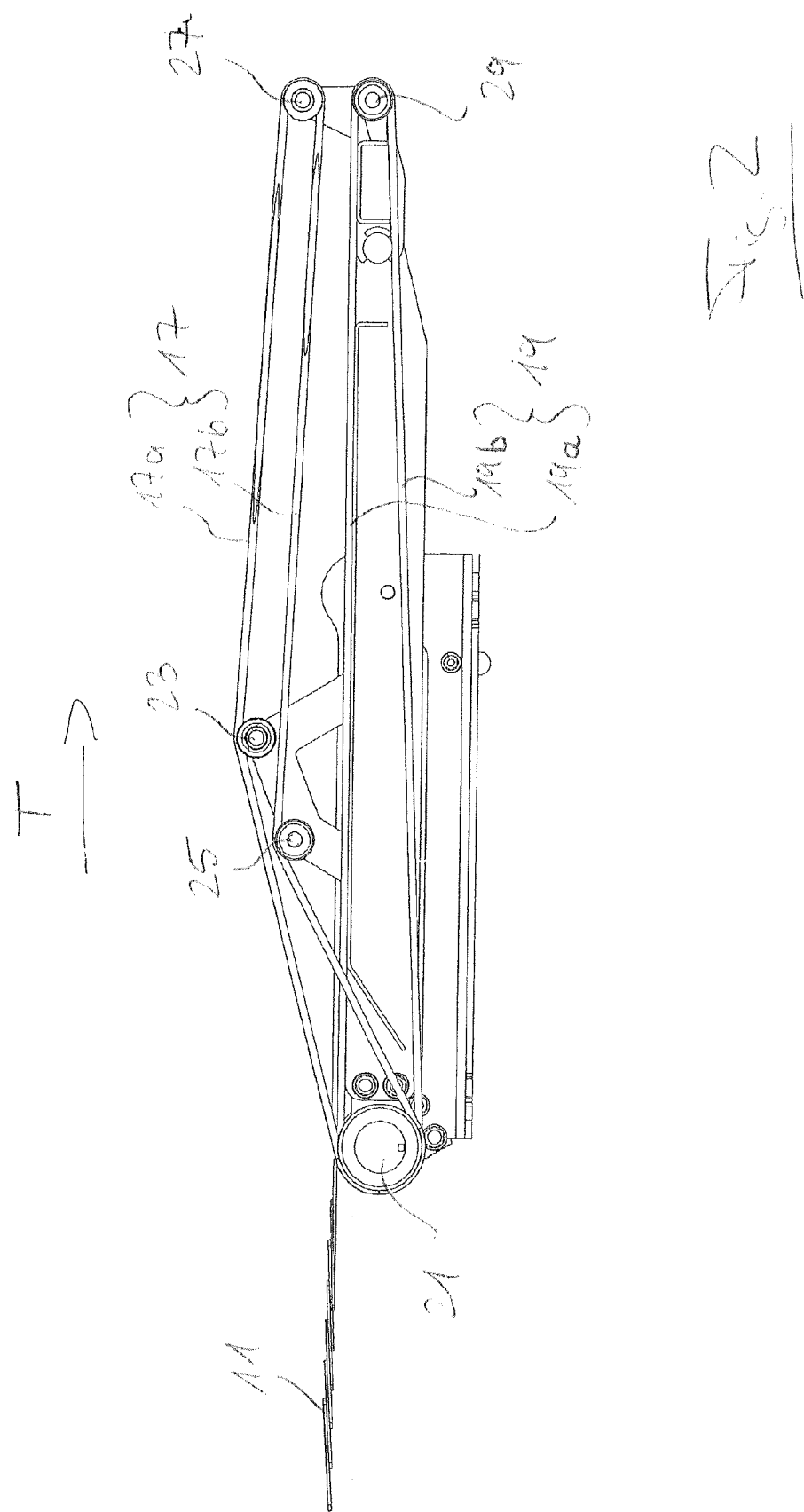
Figure 3:
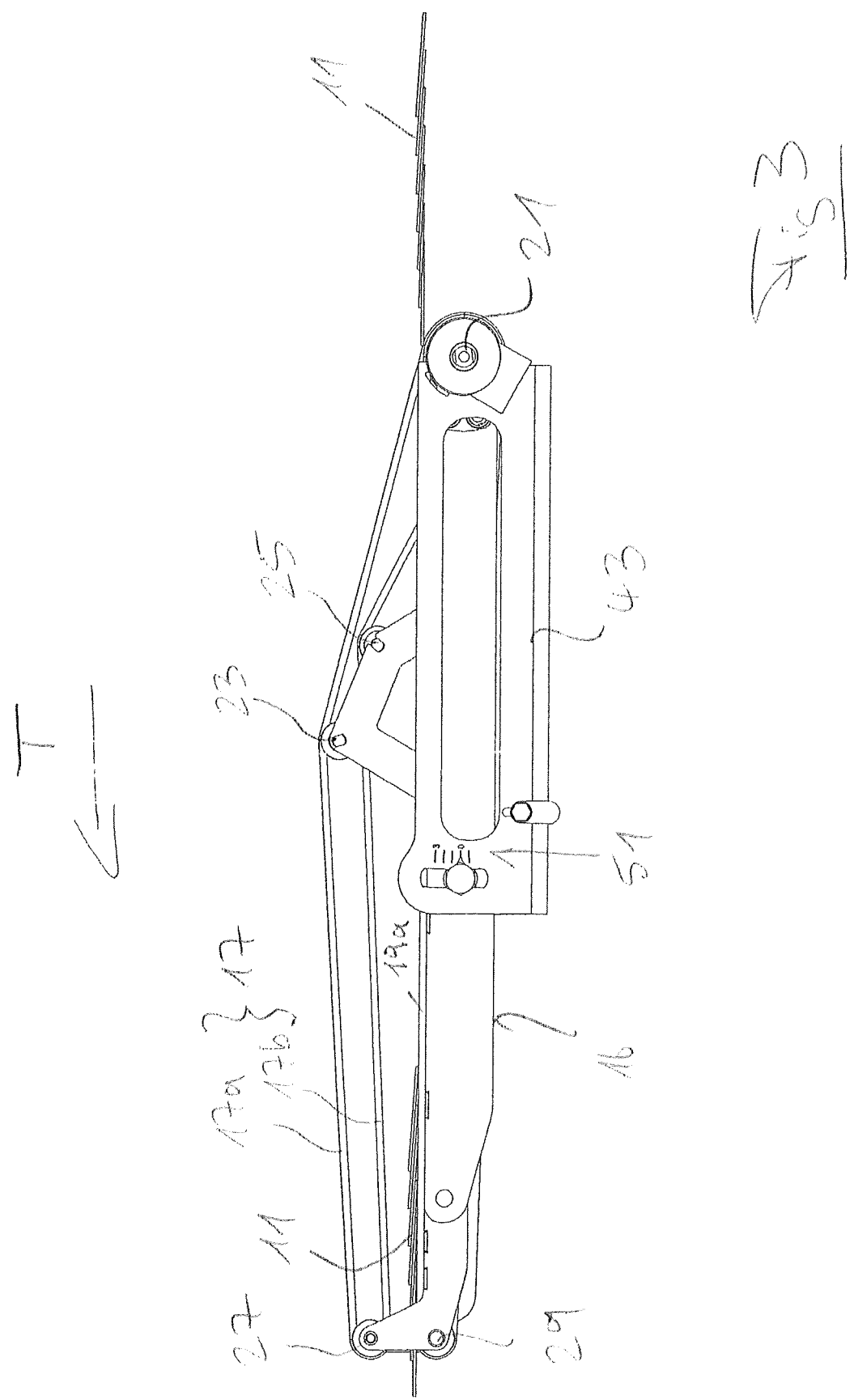
Figure 4:
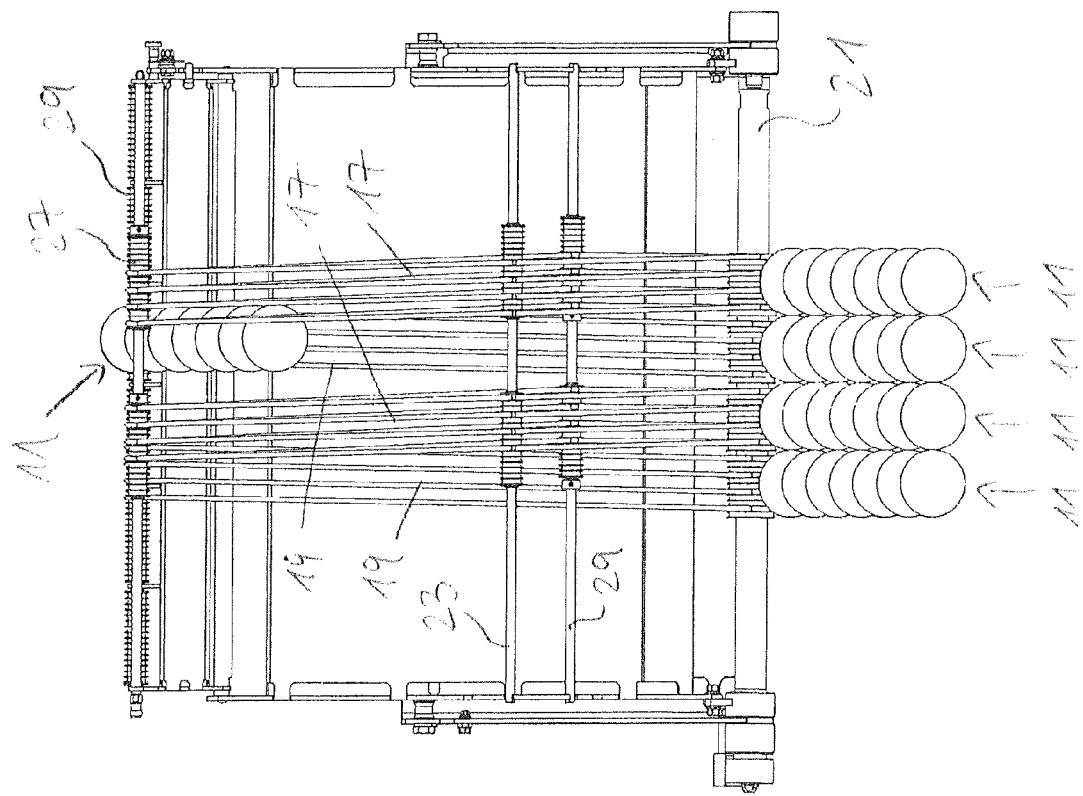

The invention will be described in the following by way of example with reference to the drawing. There are shown:

FIG. 1 a perspective view of an overlapping unit in accordance with an embodiment of the invention configured as a cassette;

FIGS. 2 and 3 a respective side view of the overlapping unit of FIG. 1;

FIG. 4 a plan view of the overlapping unit of FIG. 1,

FIGS. 5 to 9 respective part views of the overlapping unit of FIG. 1; and

FIGS. 10 to 13 a respective possible application in accordance with the invention with a plurality of specifically configured overlapping units in accordance with the invention.

The overlapping unit 15 in accordance with the invention shown is configured as a cassette which can be coupled with a substructure, not shown, for example a rack of a slicer or a rack forming an element of a conveying path. The overlapping unit 15 is provided with a frame-like base 16 for this coupling. The overlapper cassette 15 shown can consequently be handled as a whole and thus forms a module which can be removed from and reinserted into a respective substructure or rack as a whole.

The base frame 16 supports a belt conveyor which in the embodiment shown comprises two track pairs which each comprise an upper track 17 and a lower track 19 which are arranged alternately next to one another in the transverse direction.

This belt conveyor defines a longitudinal direction T between an input axle 21 at the incoming side configured as a common drive shaft for all the tracks 17, 19 and two passive, bar-shaped output axles 27, 29.

Each track 17, 19 comprises a plurality of conveyor belts which are deflected at the incoming side about the common input axle 21 and at the output side about the output axles 27, 29 at different height levels and disposed approximately vertically above one another.

The guidance of the upper tracks 17 is additionally defined by two deflection axles 23, 25 which are in turn passive and bar-shaped and which form an intermediate deflection unit for the respective upper track 17 which will be looked at in more detail in the following. The two deflection axles 23, 25 are attached to a common rocker arm 43 which is pivotable about the common input axle 21. The position of the intermediate deflection unit for the upper tracks 17 formed by the two deflection axles 23, 25 can hereby be varied relative to the base 16 and thus relative to the input axle 21 and to the output axles 27, 29 which are supported at the base 16.

Each track pair 17, 19 serves to transport in a longitudinal direction T two incoming portions 11, which here respectively comprise a plurality of slices 13 arranged overlapping in the longitudinal direction T and cut off from a food product by means of a slicer and to place them on one another with a respective predefined transverse offset, that is with a respective predefined lateral overlap. In this respect—viewed in the longitudinal direction T—a respective left portion 11 is conveyed by means of the lower track 17 and a respective right portion 11 is conveyed by means of the upper track 17 so that both portions 11 are disposed at different height levels at the outgoing end of the overlapping unit 15. In this respect, the left portion 11 is conveyed by means of the upper, forward running run of the lower track 19 and the right portion 11 is conveyed by means of the upper, forward running run of the upper track 17.

Grooved deflection sleeves serve for the deflection of the conveyor belts forming the tracks 17, 19; they will be looked at in more detail in connection with the FIGS. 5 to 8 and are arranged on the respective axle. The deflection sleeves on the two output axles 27, 29 and on the two intermediate deflection axles 23, 25 are freely rotatable, whereas the deflection sleeves at the incoming side are rotationally fixedly coupled to the drive shaft 21 forming the input axle.

When the shown overlapper cassette 15 is coupled to the above-mentioned substructure, the drive shaft 21 is connected to a drive motor, not shown, for example via a belt drive or a toothed gear drive, whereby the drive shaft 21 can be set into rotation to drive the conveyor belts of the individual tracks 17, 19 together.

The transverse position of the individual deflection sleeves is variable. The deflection sleeves can be fixed in a respective set transverse position. This will be looked at in more detail in the following.

The overlapping unit 15 in accordance with the invention can be reconfigured fast and simply in this manner for matching to a respectively desired application.

The guidance of the runs 17a, 17b of the upper track 17 and of the runs 19a, 19b of the lower track 19 can in particular be seen from the side views of FIGS. 2 and 3.

The two runs 19a, 19b of the lower track 19 each extend in a straight line between the input axle 21 and the associated output axle 29, with the upper run 19a being at least substantially disposed in a horizontal plane during operation. The diameter of the output axle 29 is smaller than the diameter of the input axle 21.

The intermediate deflection unit formed by the intermediate deflection axles 23, 25 is arranged approximately in the region of a third—viewed in the longitudinal direction T—of the longitudinal extent of the overlapping unit 15 between the input axle 21 and the output axles 27, 29. The upper deflection axle 23 disposed closer to the output axles 27, 29 lies above the output axle 27 of the upper track 17 as well as above the lower intermediate deflection axle 25 which is disposed closer to the input axle 21 and which is disposed at approximately the same height level as the output axle 27 of the upper track 17.

Two things are hereby achieved: On the one hand, both runs 17a, 17b of the upper track 17 extend sufficiently far above the upper run 19a of the lower track 19 for the remaining conveying path up to the output axle 21. On the other hand, it is ensured that the lower run 17b of the upper track 17 is so-to-say "drawn upwardly" in the region at the input side and thus arrives earlier at a height level disposed sufficiently far above the upper run 19a of the lower track 19 than without this intermediate deflection unit, wherein the "drawing up" of the upper run 17a of the upper track 17 by means of the other intermediate deflection axle 23 ensures that the upper run 17a remains above the lower run 17b of the upper track 17 in the region at the input side.

The lower intermediate deflection axle 25 at the input side additionally has the effect of an offset of the lower run 17b of the upper track 17 in the transverse direction, which will be looked at in more detail in the following.

The diameters of the two output axles 27, 27 and their vertical spacing are selected such that a portion 11 conveyed on the upper run 19a of the lower track 19 is not impeded, but simultaneously a clean placing down of a portion 11 conveyed by means of the upper run 17a of the upper track 17 onto a portion conveyed by means of the lower track 19 is ensured.

The rocker arm 43 supporting the intermediate deflection axles 23, 25 which is provided with a scale 51 at which the position of the intermediate deflection axles 23, 25 relative to the base 16 can be read off can in particular be seen from FIG. 3. In addition, a portion 11 disposed at the outgoing side on the upper run 19a of the lower track is shown in FIG. 3, the height of which portion is smaller than the vertical spacing between the lower run 17b of the upper track 17 and the upper run 19a of the lower track at the end of the overlapping unit 15 at the outgoing side.

It can in particular be seen from FIG. 4 that, viewed in the longitudinal direction T, for each track pair, the respective lower track 19 and the upper track 17 extend toward one another obliquely to the longitudinal direction T and thus in the longitudinal direction T from an arrangement next to one another at the incoming side into an arrangement laterally overlapping above one another at the outgoing side.

Figure 5:
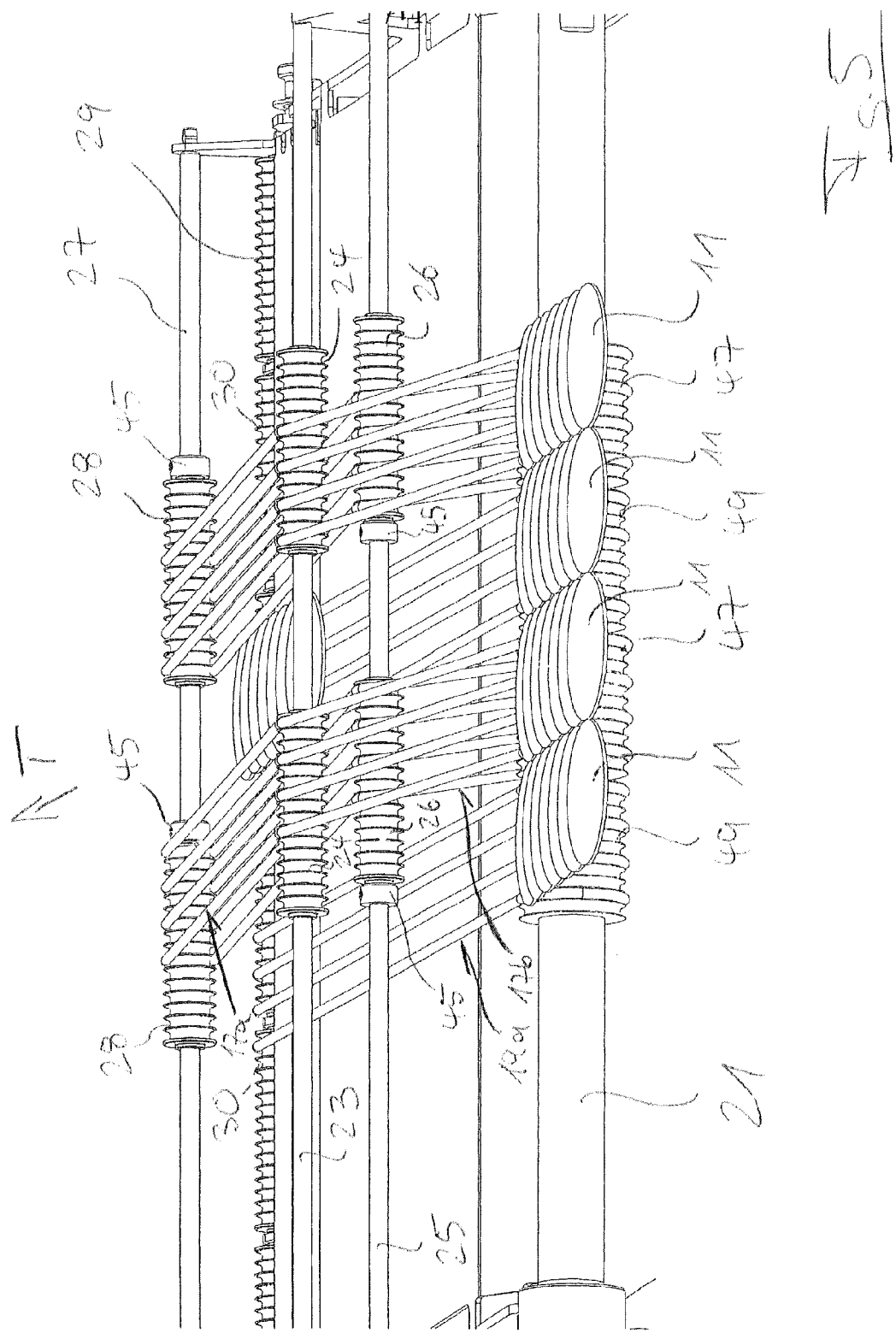

The difference in the extent of the upper run 17a to the lower run 17b of the upper track 17, and indeed in relationship with the extent of the upper run 19a of the lower track 19 can in particular be seen from FIG. 5, which shows a perspective part view approximately in the longitudinal direction T. A transverse offset of the lower run 17b relative to the upper run 17a, to the right in FIG. 5, at the input side is namely effected by means of the grooved deflection sleeve 26 of the lower intermediate deflection axle 25. It is hereby ensured that the lower run 17b of the upper track only comes into lateral overlap with the upper run 19a of the lower track when the height predefined by the lower intermediate deflection unit 25 above the upper run 19a of the lower track is reached. In other words, at the input side, the lower run 17b is "held away" laterally from the upper run 19a of the lower track to ensure a sufficient clear height or passage height for a portion 11 lying on the upper run 19a of the lower track.

This lateral holding away of the lower run 17b of the upper track additionally has the advantage that the restoring force of the conveyor belts deflected by the holding away urges the grooved deflection sleeve 26 in the opposite direction, that is to the left in FIG. 5. Consequently, for the fixing of the transverse position of the deflection sleeve 26, a fixing is only required at one side, here that is the left side, which fixing is provided in the embodiment shown in the form of a clamping ring 45 which can be fixed in the respective desired transverse position e.g. by means of a screw at the bar forming the deflection axle 25.

Figure 6:
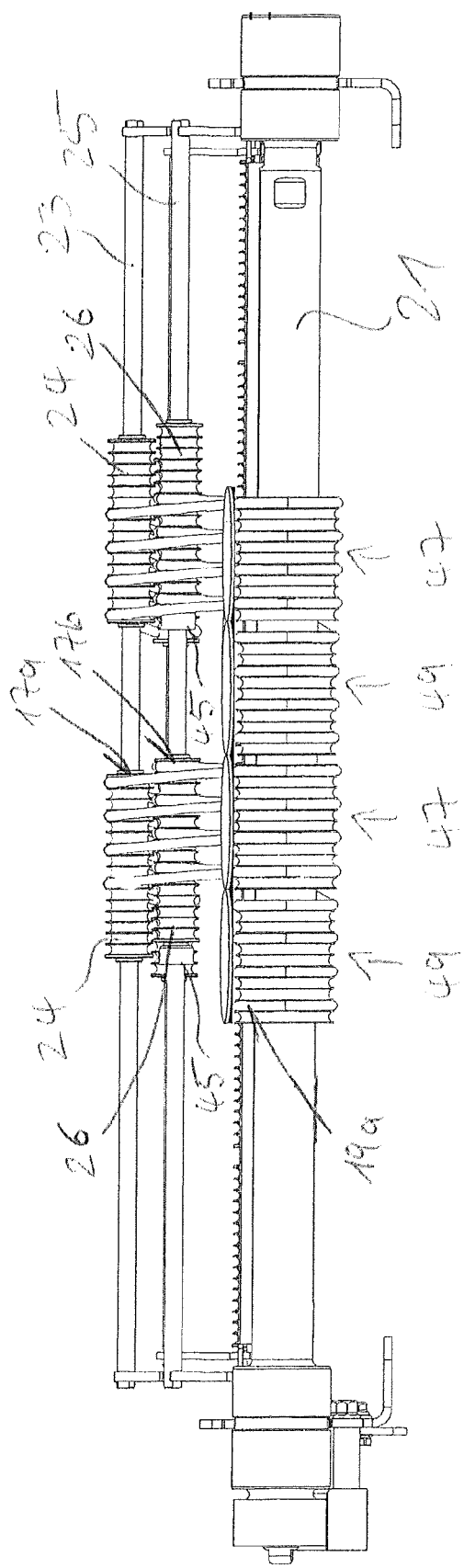

It can also be seen from FIG. 6 that at the input side up to the, viewed in the longitudinal direction T, first lower intermediate deflection axle 25, the lower run 17b of the upper track 17 does not extend in parallel with the upper run 17a, but rather slightly obliquely to the longitudinal direction T, in the sense opposite the upper run 17a, so that the lower run 17b at the input side remains outside the region above the upper run 19a of the lower track 19.

It can furthermore be seen from FIG. 6 that the deflection sleeves 47, 49 rotationally fixedly arranged on the common drive shaft 21 for the two tracks 17, 19 of each track pair have a different diameter which is respectively smaller for the upper track 19 than that for the lower track 17. Due to this respectively larger deflection path for the upper track 17 at the drive shaft 21, the conveyor belts of the upper track 17 run at a greater conveying speed than that of the lower track 19. The diameter difference is dimensioned such that the difference in the conveying speeds of the two tracks 17, 19 resulting therefrom just compensates the conveyor length difference between the two tracks 17, 19 which is caused by the different extent of the upper track 17 relative to the lower track 19. It is hereby achieved that the portion 11 of the lower track 19, on the one hand, and the portion 11 of the upper track 17, on the other hand, have no offset in the longitudinal direction T in the respective total portions formed.

As explained in the introductory part, a respective desired longitudinal offset differing from zero can alternatively be directly predefined between the portions 11 in that the diameter difference at the common drive shaft 21 or at another point is selected accordingly, that is generally a corresponding conveyor length difference between the two tracks 17, 19 is effected which corresponds to the respective desired longitudinal offset.

Other and/or additional deflections for at least one of the two tracks 17, 19 and/or additional adjustment possibilities for the deflections provided in the embodiment shown can also be provided for such settings.

Figure 7:
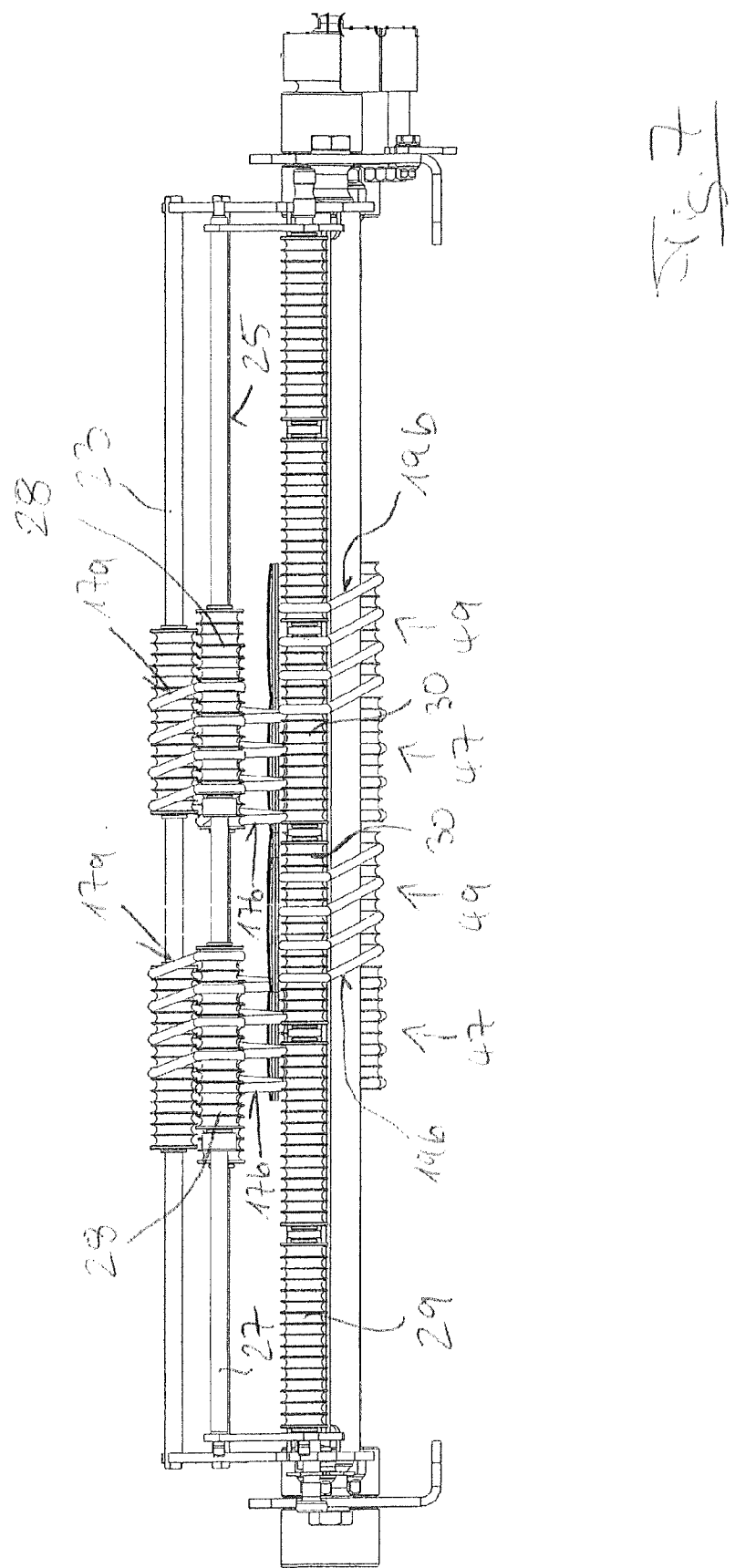
Figure 9:
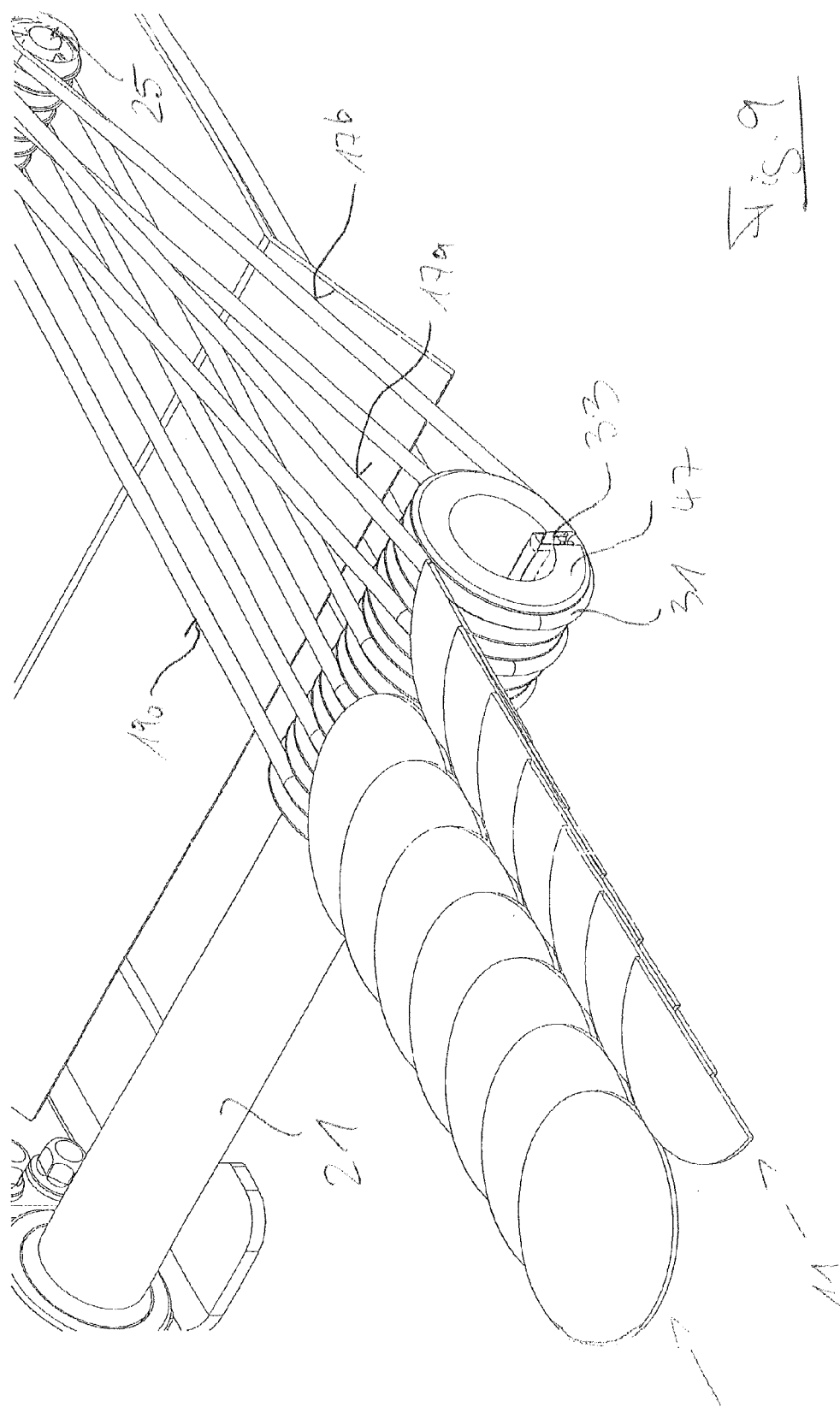

The transverse offset of the lower run 17b of the upper track—to the left here in FIG. 7—with respect to the upper run 17a in the region at the incoming side can inter alia also be seen from FIG. 7 which shows a front view of the overlapping unit 15 in accordance with the invention in a direction opposite to the longitudinal direction T.

It can furthermore be recognized in FIG. 7 by a comparison of the transverse positions of the deflection sleeves 30 of the lower output axle 29 and of the deflection sleeves 28 of the upper output axle 27 that, with the transverse positions of these deflection sleeves 28, 30 selected here, a lateral overlap is set which approximately corresponds to the transverse spacing of two conveyor belts extending directly adjacent to one another.

Figure 8:
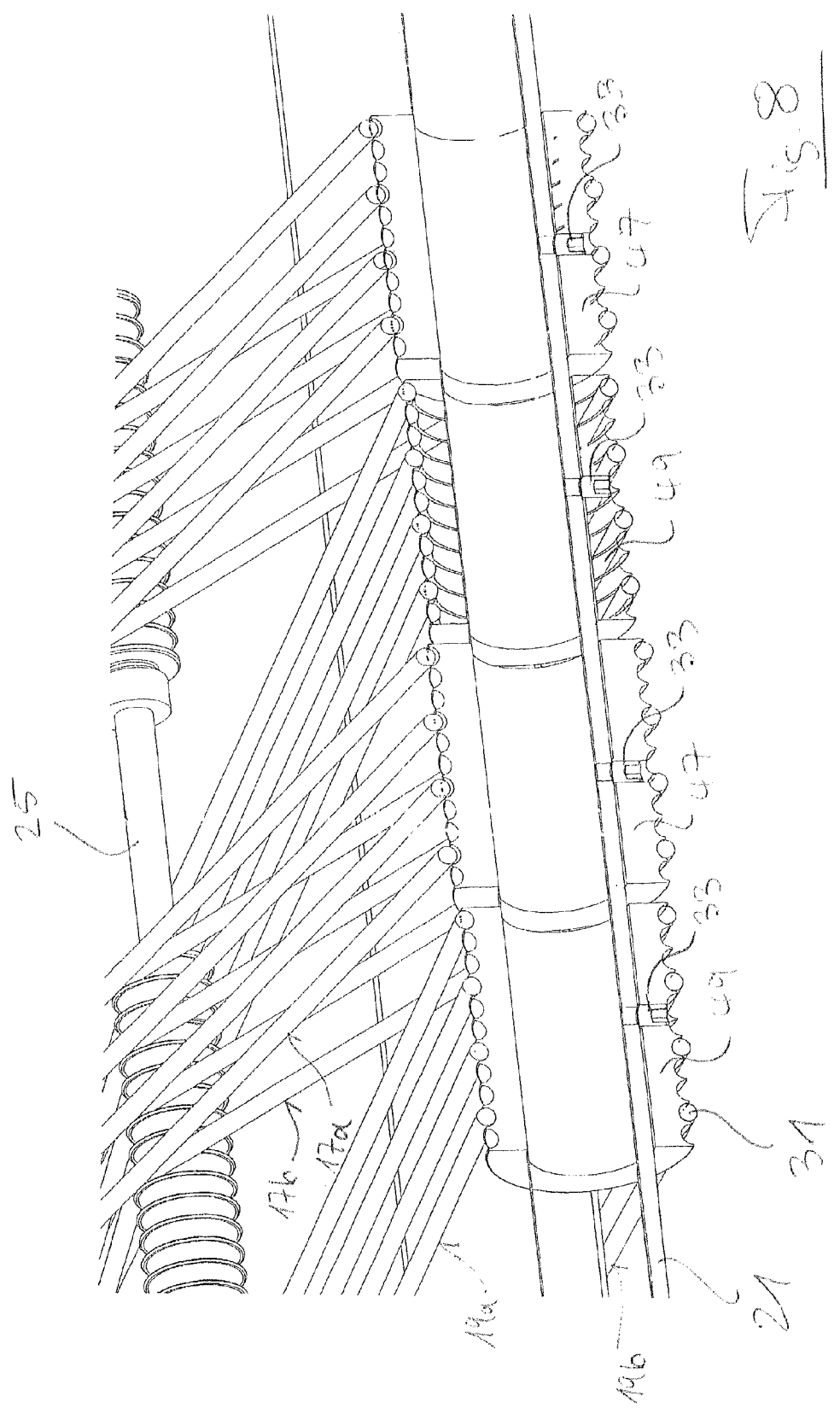

FIG. 8 in particular shows a cross-section through the common drive shaft 21 at the end of the overlapping unit 15 at the input side. As already mentioned at another passage, the cross-sectional shape of the grooves of the deflection sleeves 47, 49 is adapted to the cross-section of the conveyor belts 31. This cross-section is circular in the embodiment shown here, with other cross-sectional shapes also being possible, however.

The fixing in the transverse direction as well as the rotationally fixed coupling of the deflection sleeves 47, 49 on the drive shaft 21 take place for each deflection sleeve 47, 49 by a clamping screw 33 which respectively engages through an opening in the jacket of the deflection sleeve 47, 49 into a transverse groove of the drive shaft 21. This manner of a releasable fixing and thus adjustability of the deflection sleeves 47, 49 in the transverse direction on the drive shaft 21 can also be seen from the sectioned part view of FIG. 9.

Some applications which are possible in accordance with the invention and in which a plurality of overlapping units 15 in accordance with the invention, such as have been described above in connection with FIGS. 1 to 9, can be used will be explained in the following purely by way of example with reference to FIGS. 10 to 13, wherein the overlapping units 15 are arranged directly downstream of a conveyor 35 which can in particular be the so-called first control belt of a high-speed slicer for the simultaneous slicing of a plurality of bar-shaped or loaf-shaped food products arranged disposed next to one another. The overlapping units 15 can in this respect form an element of the so-called portioning system of the slicer which inter alia comprises the shown conveyor 35. In this respect, the overlapping units 15 can each be configured in the form of a cassette and can be integrated into a rack belonging to the slicer. The installation preferably takes place at the position of a control belt.

In each of the shown applications, a total portion 12 is present at the end of the overlapping unit 15, which is the last, viewed in the longitudinal direction T, at the outgoing side, said total portion having been formed from two or more individual portions 11 which have been produced by means of the slicer, not shown.

A further device 41 of generally any desired configuration adjoins this "cascade" of overlapping units 15 arranged after one another in the longitudinal direction T and the total portions 12 formed by the overlapping units can be transported on or further processed by means of said further device. For example, formats of one or more total portions 12 can be formed on the device 41. The onward transport of the total portions 12 or of the formats formed therefrom can take place, for example, perpendicular to the longitudinal direction T or further in the longitudinal direction T.

Figure 10:
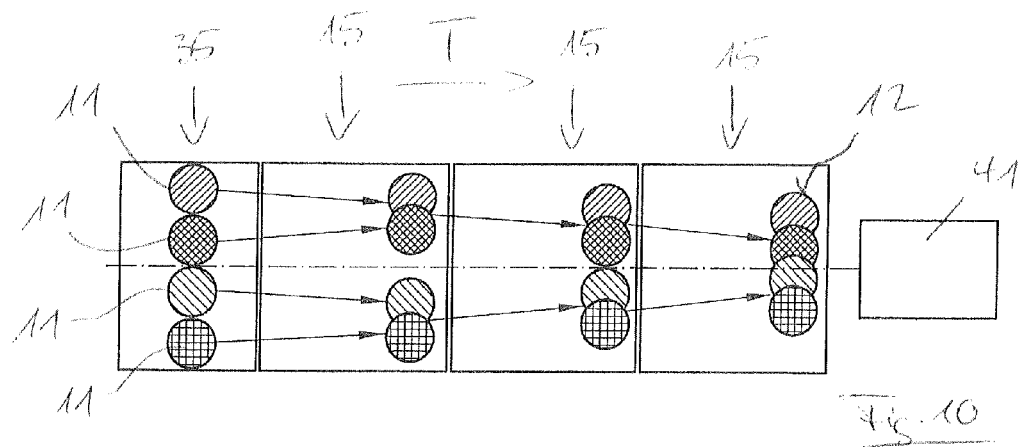

In the application in accordance with FIG. 10, portions 11 run in via the conveyor 35 in four tracks disposed laterally next to one another. For reasons of simplicity, each portion 11 is shown here in the form of a circular slice. Each portion 11 can e.g. in accordance with the representation in FIG. 1 comprise a plurality of slices arranged overlapping in the longitudinal direction T.

The two respective outer portions are first laterally overlapped by means of a first overlapping unit 15, whereupon a combination of these two overlapping portions takes place by means of a second overlapping unit 15, whereupon finally an overlapping of the two inner single portions takes place by means of a third overlapping unit 15 so that the desired total portion 12 is completed. Portions of slices having a diameter (caliber) of approximately 60 mm can, for example, be laterally overlapped to form a total portion 12 having a portion width of a total of 160 mm.

Figure 11:
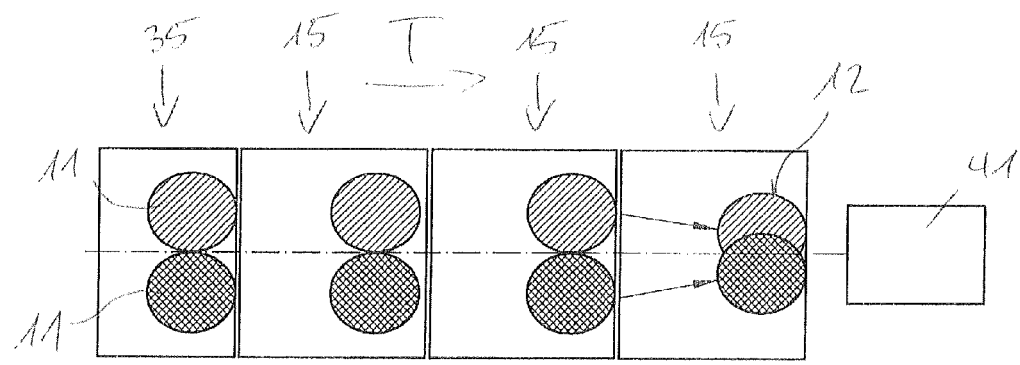

In the application in accordance with FIG. 11, the portions 11 are only incoming in two tracks, wherein the two first overlapping units 15 are only configured for "passage" and the transverse positions of the portions 11 can thus not be varied by these two first overlapping units 15. The desired total portion 12 is only formed by lateral overlapping by means of the third and final overlapping unit 15. It is consequently sufficient in the application in accordance with FIG. 11 if the overlapping units 15 each only have one track pair having a lower track and an upper track, whereas in the application in accordance with FIG. 10 the overlapping units 15 each have two such track pairs.

With the application in accordance with FIG. 11, for example, portions having a diameter (caliber) of 100 mm or of 90 mm can be laterally overlapped to form a total portion 12 having a portion width of a total of respectively 160 mm.

Figure 12:
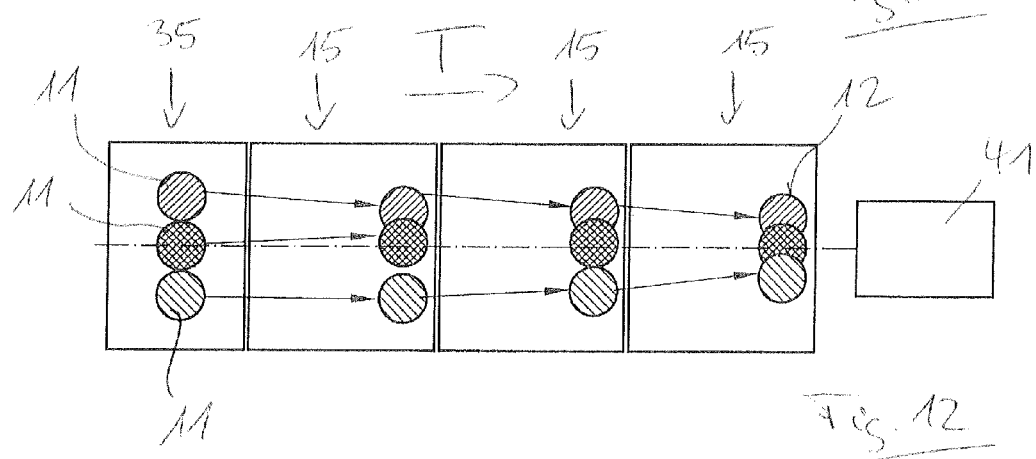

The application in accordance with FIG. 12 shows that portions 11 incoming in an odd number of tracks can be handled in a manner in accordance with the invention. The three portions 11 which are incoming disposed next to one another in this application are here guided such that first the two left portions 11 are laterally overlapped by means of the first overlapping unit 15, whereas the right portion 11 only passes through in the longitudinal direction T. Subsequently, the overlapping portion and the right portion are combined together by means of the second overlapping unit 15, whereupon the respective total portion 12 is then formed by means of the third and final overlapping unit 15, in which total portion the portion 11 originally incoming at the far right is disposed with a lateral overlap on the middle single portion.

With the application in accordance with FIG. 12, for example, portions 11 having a diameter (caliber) of 55 mm can be laterally overlapped to form a total portion 12 having a portion width of a total of 110 mm.

The total portions 12 can therefore generally in accordance with the invention be formed by means of a plurality of corresponding overlapping units 15 connected after one another in the longitudinal direction T successively by overlapping procedures taking place after one another in time at a respective one of the overlapping units, wherein one or more of the overlapping units 15 can, as required, effect either only a lateral combination without any overlapping effect or only a passage without a change of the relative transverse position.

Finally, FIG. 13 shows that a plurality of overlapping units 15 arranged after one another do not have to be used either for a lateral overlapping or for a lateral combination, but can rather each be configured "for passage". The total portion 12 then corresponds to the arrangement of the two single portions 11 at the incoming side.

FIG. 13 furthermore illustrates an option according to which, instead of the overlapper cassettes in accordance with the invention, conventional band cassettes can be used for a simple transport straight ahead.

REFERENCE NUMERAL LIST 11 portion
12 total portion
13 slice
15 overlapping unit
16 base of the overlapping unit
17 upper track
19 lower track
21 common input axle, drive shaft
23 intermediate deflection unit
24 deflection sleeve
25 intermediate deflection unit
26 deflection sleeve
27 upper output axle
28 deflection sleeve
29 lower output axle
30 deflection sleeve
31 conveyor belt
33 clamping screw
35 conveyor 41 device
43 rocker arm
45 clamping ring
47 deflection sleeve for upper track
49 deflection sleeve for lower track
51 scale
T longitudinal direction, transport direction

The invention claimed is:

1. An apparatus for the lateral overlapping of portions which are transported in a longitudinal direction and which each comprise at least one slice cut off from a food product, comprising at least one overlapping unit which comprises a belt conveyor having at least two tracks, the belt conveyor comprising a plurality of conveyor belts extending next to and spaced apart from one another to form each of the at least two tracks,
wherein an upper track and a lower track of the belt conveyor are deflected at the incoming side about a common input axle and at the outgoing side about two output axles disposed at different height levels, the two output axles comprising a first output axle and a second output axle, the upper track extending continuously between the common input axle and the first output axle, the lower track extending between the common input axle and the second output axle.

2. The apparatus in accordance with claim 1, wherein the two output axles are arranged at least substantially vertically above one another.

3. The apparatus in accordance with claim 1, wherein a longitudinal offset of the portions conveyed in the upper and lower tracks can be set to a predefined measure by setting the conveying speeds of the upper and lower tracks relative to one another.

4. The apparatus in accordance with claim 1, wherein, as a compensation for a conveyor length difference between the upper and lower tracks, the conveying speeds of the upper and lower tracks are or can be set differently.

5. The apparatus in accordance with claim 1, wherein the upper and lower tracks differ from one another with respect to their deflection path at the input axle and/or at the output axles.

6. The apparatus in accordance with claim 1, further comprising a conveyor that is connected directly upstream of the overlapping unit and that has a conveying speed which lies between the conveying speeds of the upper and lower tracks.

7. The apparatus in accordance with claim 1, wherein both the upper track and the lower track extend obliquely to the longitudinal direction.

8. The apparatus in accordance with claim 1, wherein an intermediate deflection unit for the lower run of the upper track is configured to be active both in an inclination-varying manner and in a direction-varying manner.

9. The apparatus in accordance with claim 1, wherein both runs of the lower track each extend in a straight line between the input axle and the output axle.

10. The apparatus in accordance with claim 1, wherein a plurality of overlapping units are connected after one another in the longitudinal direction.

11. The apparatus in accordance with claim 1, wherein the deflection position at the incoming side and/or at the outgoing side can be varied in a transverse direction for at least one of the upper and lower tracks.

12. The apparatus in accordance with claim 1, wherein the overlapping unit comprises a plurality of track pairs which are arranged next to one another in the transverse direction and which each have an upper track and a lower track.

13. The apparatus in accordance with claim 1, wherein the overlapping unit is configured as a cassette, namely as a module which is coupled in operation to a stationary substructure, which is removable and reinsertable as a whole and which comprises a base for coupling to the substructure and comprises the belt conveyor supported by the base.

14. The apparatus in accordance with claim 13, further comprising a drive motor for the cassette that is integrated into the substructure and that remains at the substructure with a removed cassette.

15. An apparatus for the lateral overlapping of portions which are transported in a longitudinal direction and which each comprise at least one slice cut off from a food product, comprising at least one overlapping unit which comprises a belt conveyor having at least two tracks,
wherein an upper track and a lower track of the belt conveyor are deflected at the incoming side about a common input axle and at the outgoing side about two output axles disposed at different height levels,
wherein a common drive is associated with the upper and lower tracks, the common input axle of the upper and lower tracks being driveable with the common drive.

16. An overlapping unit for the lateral overlapping of portions which are transported in a longitudinal direction and which each comprise at least one slice cut off from a food product, having a belt conveyor comprising at least two tracks,
wherein an upper track and a lower track of the belt conveyor are deflected at the incoming side about a common input axle and at the outgoing side about two output axles disposed at different height levels;
wherein the overlapping unit is configured as a cassette, namely as a module which is coupled in operation to a rack, which can be removed and can be reinserted as a whole and which comprises a base for coupling to the rack and comprises the belt conveyor supported by the base.

17. An apparatus for the lateral overlapping of portions which are transported in a longitudinal direction and which each comprise at least one slice cut off from a food product, the apparatus comprising:
at least one overlapping unit which comprises a belt conveyor having at least two tracks;
wherein an upper track and a lower track of the belt conveyor are deflected at the incoming side about a common input axle and at the outgoing side about two output axles disposed at different height levels; and
an intermediate deflection unit for the upper track that is arranged between the common input axle and the respective output axle.

18. The apparatus in accordance with claim 17, wherein the intermediate deflection unit is configured to be activated in an inclination-varying manner such that the upper track extends in a region at the output side with both runs above the lower track.

19. The apparatus in accordance with claim 17, wherein the intermediate deflection unit is configured to be effective in a direction-varying manner such that a lower run of the upper track includes a different angle with the longitudinal direction in a region at the input side than an upper run of the upper track.

20. The apparatus in accordance with claim 19, wherein the intermediate deflection unit is configured to avoid or reduce a lateral overlap between the lower run of the upper track and an upper run of the lower track until a predefined clear height between these two runs is reached.

21. An apparatus for the slicing of food products, having an apparatus in accordance with claim 1 or an overlapping unit in accordance with claim 16, wherein the overlapping unit is integrated into a rack of the slicing apparatus.

22. A method for forming total portions which each comprise at least two laterally overlapping portions which each comprise at least one slice cut off from a food product, the method comprising the steps of:
- supplying the two portions in tracks disposed next to one another to an overlapping unit which comprises a belt conveyor associated with the two tracks one of which is an upper track leading to an upper height level and the other of which is a lower track leading to a lower height level;
- conveying an upper portion by means of the upper track above a lower portion conveyed by means of the lower track, the belt conveyor comprising a plurality of conveyor belts extending next to and spaced apart from one another to form each of the at least two tracks;
- deflecting the upper track and the lower track at an incoming side about a common input axle and at an outgoing side about two output axles disposed at different height levels, the two output axles comprising a first output axle and a second output axle, the upper track extending continuously between the common input axle and the first output axle, the lower track extending between the common input axle and the second output axle; and
- subsequently placing the upper portion onto the lower portion, wherein the upper track and the lower track are disposed at different height levels next to one another at the incoming side and laterally overlapping at the outgoing side.

23. The method of claim 22, wherein the total portions are each formed by means of a plurality of overlapping units connected after one another in the longitudinal direction successively by overlapping procedures taking place after one another in time at a respective one of the overlapping units.

24. The method of claim 22, wherein a longitudinal offset of the portions conveyed in the upper and lower tracks is set to a predefined measure by setting the conveying speeds of the upper and lower tracks relative to one another.

25. The method of claim 22, wherein a conveyor length difference between the upper and lower tracks is compensated in that the conveying speeds of the upper and lower tracks are set differently.

26. A method for forming total portions which each comprise at least two laterally overlapping portions which each comprise at least one slice cut off from a food product, the method comprising the steps of:
- supplying the two portions in tracks disposed next to one another to an overlapping unit which comprises a belt conveyor associated with the two tracks one of which is an upper track leading to an upper height level and the other of which is a lower track leading to a lower height level;
- conveying an upper portion by means of the upper track above a lower portion conveyed by means of the lower track;
- driving a common input axle of the upper and lower tracks with a common drive associated with the upper and lower tracks; and
- subsequently placing the upper portion onto the lower portion, wherein the upper track and the lower track are disposed at different height levels next to one another at the incoming side and laterally overlapping at the outgoing side.

27. A method for forming total portions which each comprise at least two laterally overlapping portions which each comprise at least one slice cut off from a food product, the method comprising the steps of:
- supplying the two portions in tracks disposed next to one another to an overlapping unit which comprises a belt conveyor associated with the two tracks one of which is an upper track leading to an upper height level and the other of which is a lower track leading to a lower height level;
- conveying an upper portion by means of the upper track above a lower portion conveyed by means of the lower track;
- varying a direction of the upper track with an intermediate deflection unit that is arranged between a common input axle and an output axle; and
- subsequently placing the upper portion onto the lower portion, wherein the upper track and the lower track are disposed at different height levels next to one another at the incoming side and laterally overlapping at the outgoing side.

* * * * *